July 24, 1962  L. Z. FREELAND  3,045,951
AIRCRAFT
Filed March 24, 1960  2 Sheets-Sheet 1

Leonor Zalles Freeland
INVENTOR.

BY *Clarence A. O'Brien
and Harvey B. Jacobson*
Attorneys

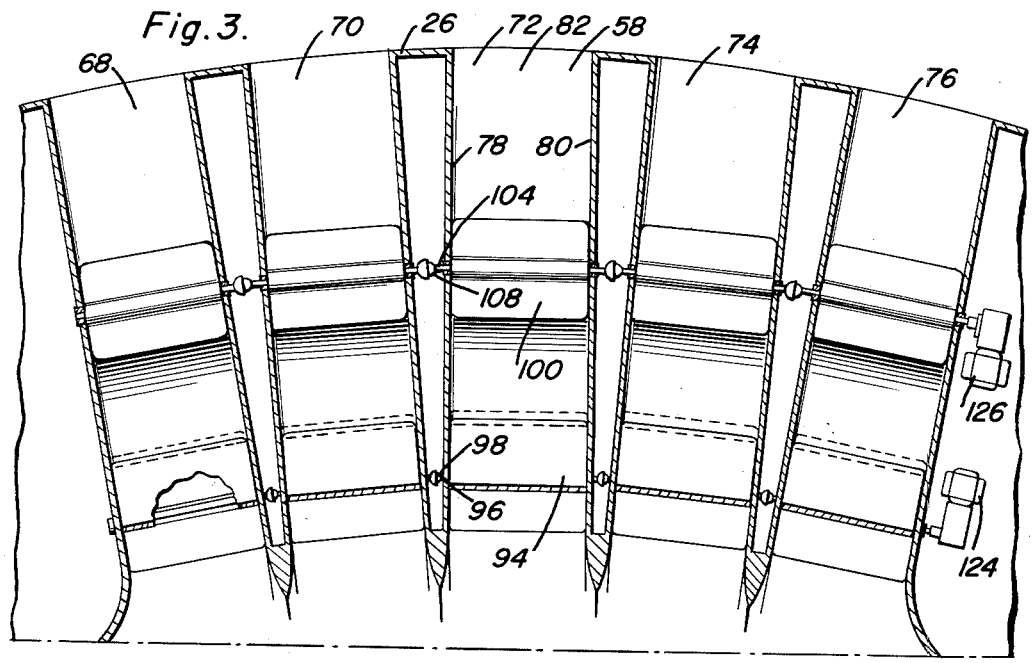
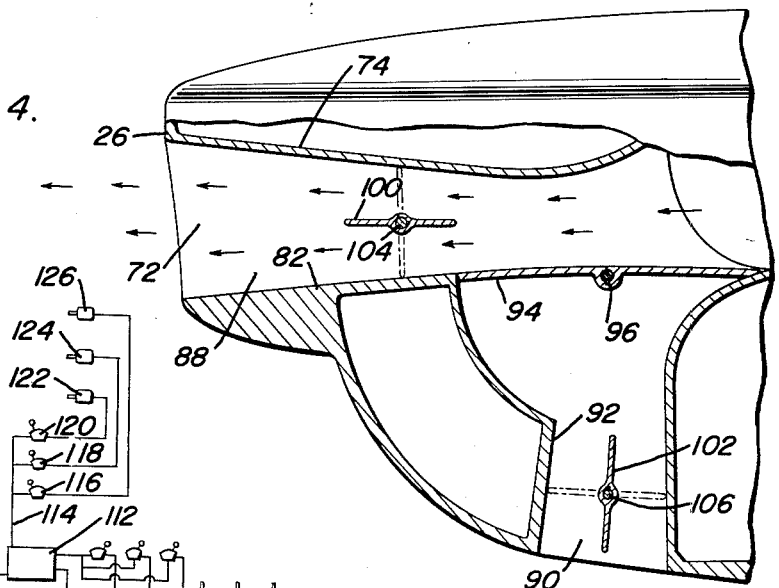
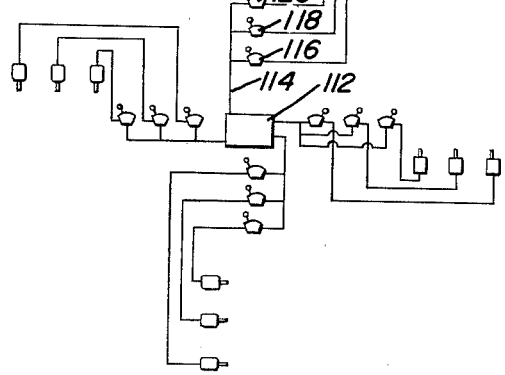
Leonor Zalles Freeland
INVENTOR.

United States Patent Office 3,045,951
Patented July 24, 1962

3,045,951
AIRCRAFT
Leonor Zalles Freeland, 4803 Grantham Ave.,
Chevy Chase 15, Md.
Filed Mar. 24, 1960, Ser. No. 17,296
8 Claims. (Cl. 244—23)

This is a continuation-in-part of pending application U.S. Serial No. 858,446, now abandoned, which was filed on December 9, 1959, and which is a continuation-in-part of application Serial No. 566,650, now abandoned, filed February 20, 1956.

The invention relates to aircraft and more particularly to the class of aircraft capable of vertical flight, hovering and lateral flight.

In the copending application there is a description covering a number of forms of aircraft, each entailing an aircraft body provided with a chamber containing air inlet ports or openings and discharge ports or openings through which air under pressure is expelled by the operation of motors preferably located within the air chamber. An object of this invention is to provide an improved control system and propulsion system utilizing the same principles of operation described in the copending application, but having a materially simplified air discharge duct system for the discharge of air under pressure.

Briefly, an aircraft in accordance with the invention has an annular chamber defined by upper and lower panels together with a peripheral wall. The chamber has a number of air inlet openings, and there are air motors of a selected type located in the chamber to draw air into the chamber by way of the air inlet openings.

There are a plurality of groups of air discharge ducts registered with the chamber and each duct has a first passageway which opens laterally outwardly of the aircraft body, together with a second passageway which opens downwardly of the same aircraft body. The groups of air discharge ducts are arranged to extend radially outwardly from the central vertical axis of the aircraft body, and the ducts are capable of producing propulsion and/or control forces in a horizontal plane, assuming a perfectly level attitude of the aircraft. The remaining passageways open downwardly and being located in groups arranged in a circular pattern concentric with the vertical axis of the aircraft and when air is expelled from the downwardly extending ducts under a high velocity and pressure, upward forces are produced. Furthermore, roll and pitch may be obtained by regulating control valves in the downwardly opening passageway, while forward, aft, port and starboard control forces may be obtained by adjusting the air valves in the lateral ducts. Various combinations of forces about the horizontal axes of the aircraft may be obtained by various adjustments of the control valves due to arrangement of the groups of ducts.

The two passageways of each duct are under the control of a deflector which apportions air between the lateral and the downward passageways in accordance with the necessities as judged by the pilot. In this way i.e. with the control valves for the passageways and the deflectors between passageways, control forces for the aircraft are obtained.

Accordingly, it is a further object of the invention to provide an aircraft of the type under consideration with a unique control and propulsion system involving the control of a fluid medium passing through various ducts under pressure and at an appreciable velocity.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged sectional view showing one group of ducts of the aircraft.

FIGURE 4 is an elevational view of a portion of the aircraft body, certain parts shown in section to illustrate the construction of duct.

FIGURE 5 is a diagrammatic view showing one possible method of control for the various ducts.

In the accompanying drawings there is an illustration of an aircraft 10 having a body 12. This body is exceedingly similar in configuration to the main aircraft body in the referred to pending application. Further, many of the components of aircraft 10 are identical to corresponding components in the aircraft of the copending application. For instance, the landing gear 14 may be the same, and the passenger and/or cargo areas as well as the pilot and crew quarters are the same.

Figure 2:
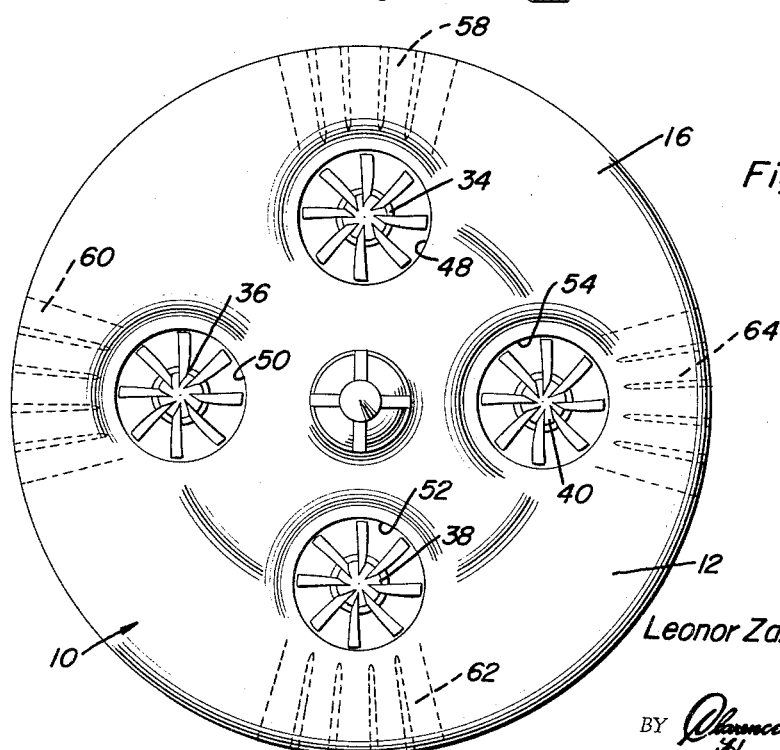
FIGURE 2 is a top view of the aircraft in FIGURE 1.

The aircraft body may be considered as constructed of an upper wall or panel 16 which is circular in plan form (FIGURE 2) and which is convex. A lower wall or panel 18 is connected by an inner wall 20 forming an inner continuation of wall 18, to panel 16. The panels 16 and 18 are spaced from each other to define an annular chamber 22 which is an air compression chamber. A peripheral wall 26 is at the edges of panels 16 and 18, and there is internal bracing 28 for the body of the aircraft. The internal bracing 28 is in the form of a continuous circular and transversely curved wall and cooperates with an adjacent portion 30 of panel 18 to form a throat 32 of smaller cross-sectional area than chamber 22.

There are a plurality of motors 34, 36, 38 and 40, and these motors may assume a number of configurations such as electric motors, internal combustion engines, etc. Each motor has a propeller 42 connected therewith, and in those cases where axial flow motors are used, no propeller will be required. Suitable motor mounts 44 are secured to the motors and to panel 18 rigidly and firmly supporting the motors with propellers 42 located in the four air inlet openings 48, 50, 52 and 54 which are formed in panel 16 and which are located on a pair of horizontal axes perpendicular to one another.

There are four groups 58, 60, 62 and 64 of air discharge ducts registered with the passage 32, and the groups are located on horizontal axes which were mentioned previously. A typical group 58 of ducts is shown in detail in FIGURES 3 and 4. This group contains five ducts 68, 70, 72, 74 and 76, and the ducts are substantially radially arranged with respect to the longitudinal axis of the aircraft body 12. Although the ducts may be made annular or circular in cross-section, they are shown rectangular in cross-section, and each duct, for instance duct 72 has a pair of side walls 78 and 80, a bottom wall 82 and a top wall 84. As shown in FIGURE 4 the ducts are in the form venturis or at least, modified venturis. Further, the described duct 72 has walls 78, 80, 82 and 74 defining a lateral passageway 88 which opens through wall 26 at one end and which opens into or at least communicates with chamber 22 at the other end. The longitudinal axis of passageway 88 is essentially horizontal when the aircraft is in a straight and level attitude. Typical duct 72 has a downwardly opening passageway 90 defined by four walls 92 arranged in rectangular formation. The longitudinal axes of passageways 88 and 90 intersect at approximately, but not precisely, right angles to each other.

A control deflector 94 is mounted for rotational adjustment at the intersection of the passageways 88 and 90, and it is in the form of a vane attached to a shaft 96. The vane is capable of swinging between positions shown in FIGURES 1 and 4 respectively i.e. at which the air from chamber 22 flows through either passageway 88 or passageway 90. In an intermediate position of adjustment the air is apportioned between passageways 88 and 90. FIGURE 3 shows that the five deflectors 94 for the five ducts have their shafts 96 coupled together by means of universal joints 98 so that all deflectors operate in unison i.e. all of the deflectors for one group 58 of ducts. As in the copending application, this invention contemplates utilizing separate or individual controls and control means for the various deflectors.

Control valve 100 is mounted in passageway 88, and control valve 102 is mounted in passageway 90. The control valve 100 is secured to a shaft 104, while control valve 102 is secured to shaft 106. Shaft 104 is coupled to the adjacent shafts of the adjacent ducts by means of universal joint 108 so that all of the corresponding valves 100 are operative in unison. The same holds true for the valve 102. Each of the downwardly opening passageways of each of the ducts has a control valve 102 therein, and the control valves 102 for one group of ducts are coupled together by shafts and universal joints or the like so that they are operated in unison.

Attention is now invited to FIGURE 5. This figure is a diagrammatic representation of an electrical system for operating the deflectors of the four groups and the control valves of the four groups of ducts. Other means may be resorted to for causing the deflectors and valves to be operated, for instance means similar to those described in the copending application. The illustration in FIGURE 5 shows an electrical power supply 112 with a power line 114 extending therefrom. There are three control switches 116, 118 and 120, all energized from power line 114, and these are secured to three motors 122, 124 and 126. The motor 126 is mechanically coupled, for example by a gear reducer, to the shafts 104 causing operation of deflectors 102. Motor 124 is drivingly connected with shafts 96 to actuate all of the deflectors 94. Motor 122 is mechanically coupled to shaft 104 in order to cause all of the control valves 100 of one group to operate. It is evident that there are similar controls for the remaining groups 60, 62 and 64 of ducts and more particularly, the control elements in the passageways thereof. The disclosed system is ideally suited for operation by a conventional gyroscopic system such as an automatic pilot.

Figure 1:
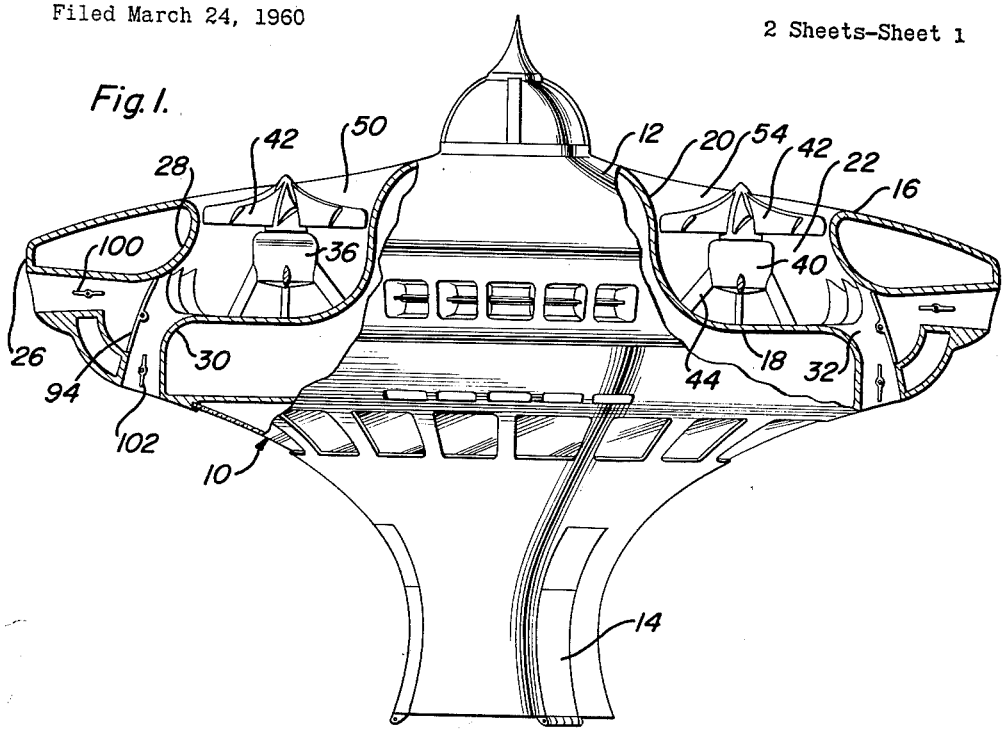
FIGURE 1 is a side elevational view of the aircraft, parts broken away in section to illustrate otherwise obscure details.

In operation the motors 34, 36, 38 and 40 are energized so as to rotate propellers 42. Air is drawn into the inlets 48, 50, 52 and 54 and enters chamber 22. Assume a vertical take-off is desired. All of the control deflectors 94 are adjusted to the position shown in FIGURE 1 at which all passageways 88 are blocked. The total quantity of air will then flow through passageways 90 and the control valves 102 will be opened as shown in FIGURE 1. Assume now that forward motion is desired. The deflectors for the group 62 of ducts are adjusted to the position shown in FIGURE 4 at which the total quantity of air will be discharged rearwardly of the aircraft and in an approximately horizontal plane. The deflectors 94 of group 58 may be in any position since valves 100 and 102 thereof must be closed. The same holds true for the passageways of the groups 60 and 64 of ducts. Such a condition is satisfactory for taxiing on an airfield, however, to sustain flight and have forward propulsion, the deflectors 94 must be adjusted to the position shown in FIGURE 1, and the valves 102 of groups 60 and 64 must be opened to provide an upward component of force. Rolling moments are obtained by opening the valves 102 of ducts 60 or 64 more than the other. A pitching moment may be obtained by opening valves 102 of duct 58 and/or the group 62 of ducts. In order to obtain the equivalent of yaw control, air is permitted to discharge from the lateral passageways 88 of the groups 60 or 64 of ducts. When coupled with a force derived from the lateral passageways 88 of the group 62 of ducts, the resultant force will move the aircraft to the left or to the right, and the amount of deviation from forward flight will be dependent upon the magnitude of the comparative forces tending to move the aircraft to the side and forwardly respectively. These are normally all of the control forces that are required for take-off, landing, hovering and lateral flight since the aircraft is symmetrical in exterior shape about any plane containing its vertical axis and has a smooth exterior surface as shown in the drawings. Therefore, there are no external force tending to rotate the air craft. However, if it is desired to cause or control rotation of the aircraft about its vertical axis, this may be accomplished by providing the aircraft with conventional and well known yaw control devices such as those disclosed in U.S. Patents Nos. 1,378,112, 1,705,489, 2,518,697, 2,988,303, 2,944,762 and 2,952,422. In all instances the attitude of the aircraft may be altered by adjusting the valves 102 of a particular group. This applies to the fore, aft, starboard and port sides. Arbitrarily assuming that the aircraft has a front end and a rear end (which may be at any two diametrically opposite points on its periphery), it is quite evident that since the aircraft is symmetrical, it is capable of flying to the left, to the right, forward, rearward, or directions between these main directions with equal facility.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aircraft having a body provided with an upper panel and a lower panel defining an annular chamber, said upper panel having a plurality of air inlet openings arranged around the vertical axis of said chamber, air moving motor means in said openings to draw air into said chamber, a plurality of groups of air discharge ducts registered with the chamber, each duct branching into a first passageway which opens laterally outwardly of said body and a second passageway which opens downwardly of said body, and a control deflector at the juncture of said passageway to direct air from said chamber selectively into said first and second passageways.

2. The combination of claim 1 wherein there are control valves in each of said passageways for selectively closing, opening and restricting same to exercise an additional flow control function over the flow through said passageways.

3. In an aircraft, an aircraft body having an upper circular convex panel and a lower panel, a peripheral wall joining the outer edges of said panels, said panels being spaced apart to define an annular chamber, a plurality of vertically extending air inlet openings in said upper panel, a plurality of motors carried by said body to draw air into said inlet openings and into said chamber from said inlet openings, circumferentially spaced groups of air discharge ducts in said body and communicating at their inner ends with said chamber, each duct having a first horizontal passageway opening through said peripheral wall and a second passageway opening through said lower panel, said passageways having longitudinal flow axes intersecting adjacent to said chamber, a control deflector, means movably mounting said deflector adjacent to the intersection of said axes, said deflector being movable to apportion airflow from said chamber through said first and second passageways and completely contained within said passageways during all phases of its movement.

4. In an aircraft, an aircraft body having an upper circular convex panel and a lower panel, a peripheral wall joining the outer edges of said panels, said panels being spaced apart to define an annular chamber, a plurality of air inlet openings in said upper panel, a plurality of motors carried by said body to draw air into said inlet openings and into said chamber from said inlet openings, circumferentially spaced groups of air discharge ducts in said body and communicating at their inner ends with said chamber, each duct having a first passageway opening through said peripheral wall and a second passageway opening through said lower panel, said passageways having longitudinal flow axes disposed at an angle to each other and intersecting adjacent to said chamber, a control deflector, means movably mounting said deflector adjacent to the intersection of said axes, said deflector being movable to apportion airflow from said chamber through said first and second passageways, a flow control valve in each of said passageways downstream of said control deflector to provide additional control over the quantity of air flowing through said passageways.

5. The airplane of claim 4 wherein said first passageway axis is approximately horizontal when said second passagway is approximately vertical.

6. Control means in combination with an aircraft having a plurality of power driver propellers each normally rotating on a vertical axis within a first vertically extending duct, said control means comprising a horizontally extending passage connected into the lower end of the vertical duct, a vertical passage connected to said horizontal passage adjacent its connection to the vertical duct and extending downwardly therefrom, a selector valve within said horizontal and vertical passages at the junction thereof, a first control valve in said horizontal passage adjacent said selector valve and a second control valve in said vertical passage below said selector valve.

7. A control means as recited in claim 6 wherein each of said valves comprises at least one rotatable butterfly valve and said selector valve is arcuate in cross-section.

8. A control means as recited in claim 7 wherein said horizontal passage and said vertical passage each is divided into a plurality of side-by-side and slightly diverging ducts each containing one of said butterfly valves, said valve and said selector valve is arcuate in cross-section. having their adjacent ends connected by universal joints and one of said valves in each passage having its shaft connected to power means.

References Cited in the file of this patent
UNITED STATES PATENTS

| | | |
|---|---|---|
| D. 182,717 | Freeland | May 6, 1958 |
| 1,585,281 | Craddock | May 18, 1926 |
| 2,377,835 | Weygers | June 5, 1945 |
| 2,461,435 | Neumann | Feb. 8, 1949 |
| 2,838,257 | Wibault | June 10, 1958 |

FOREIGN PATENTS

| | | |
|---|---|---|
| 480,789 | Canada | Feb. 5, 1952 |